Patented June 18, 1929.

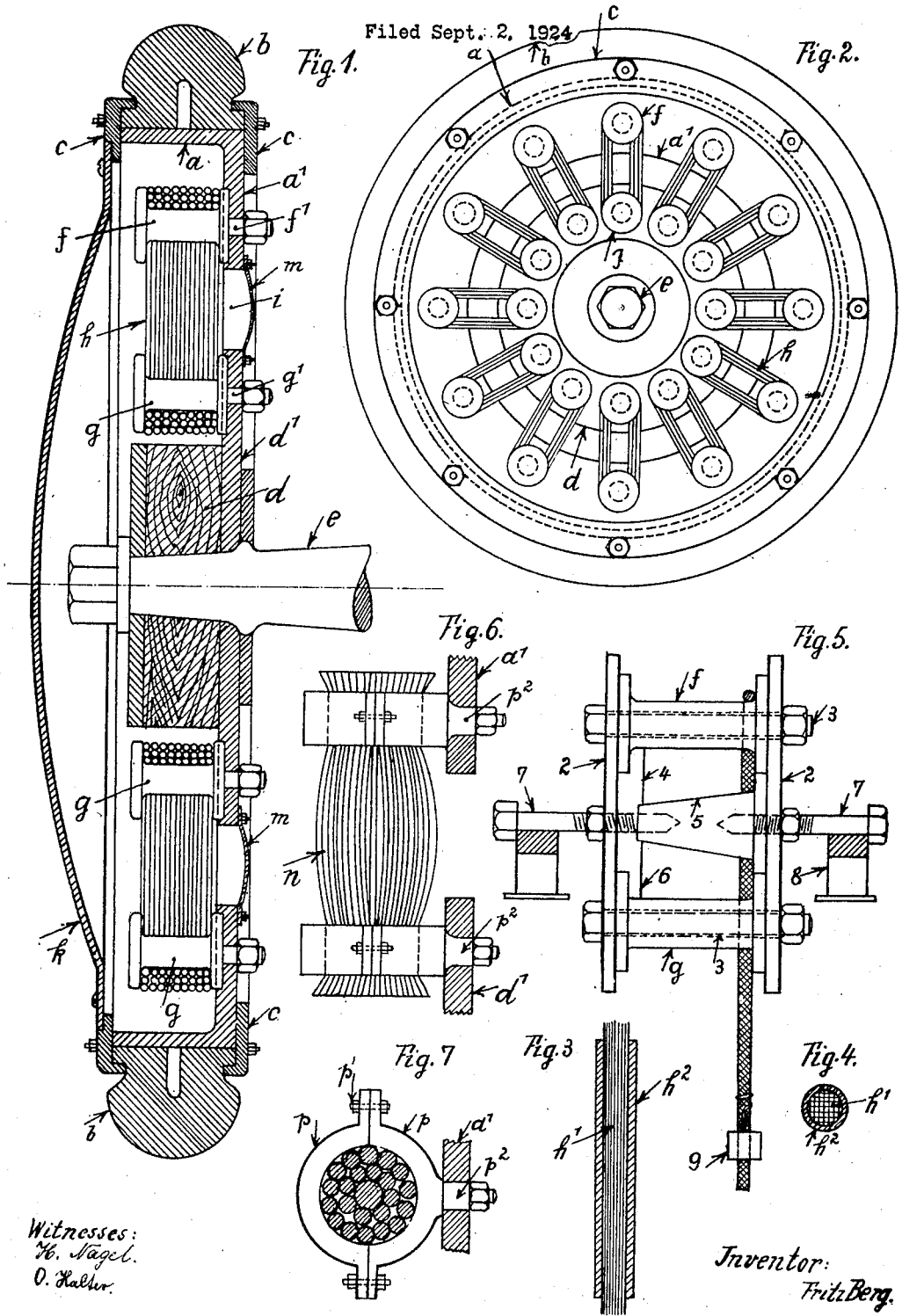

1,717,548

UNITED STATES PATENT OFFICE.

FRITZ BERG, OF MANNHEIM, GERMANY.

RESILIENT WHEEL.

Application filed September 2, 1924, Serial No. 735,492, and in Germany September 27, 1923.

This invention relates to improvements in resilient wheels for road vehicles of the kind employing elastic members of rubber to join the hub or inner wheel part to the felly or outer wheel part, and its object is to provide an elastic form of connection between the inner and outer wheel parts which will also retain these parts in their proper relative positions, thereby enabling me to dispense with special side guiding means, with relatively sliding metallic parts, between the hub and felly. A further object is to avoid all heating and friction in the wheel and in the rubber connecting parts or spokes.

According to this invention the rubber spokes consist each of a bundle of relatively thin rubber cords, all initially tensioned whereby the total sum of the separate tensions in each cord is adequate to hold the wheel parts in their proper relative positions without causing undue stresses in the rubber. When the wheel is loaded, all shocks are distributed over all the cords of those spokes which are in tension, which has been added owing to the load, whereby the fluctuation of load on each cord may be retained within reasonable limits. All necessity for metallic side guides or equivalent means is dispensed with and the durability of the wheel enhanced. The rubber cords may be assembled into cables and covered with fabric or threads or the like to form a protective casing. Experiments have shown that this form of resilient wheel on a motor vehicle travelling over bad roads will last at least for 10,000 miles without causing difficulty due to friction or heating.

The invention is illustrated by way of example in the accompanying drawings, in which:

Figure 1 is a vertical section through a wheel for a road vehicle according to this invention, Figure 2 is a side view of the same to a smaller scale, with the shield plate removed;

Figure 3 is a longitudinal section and

Figure 4 is a cross section of the rubber cable which I prefer to employ;

Figure 5 is a diagram of the device I prefer to employ for imparting the desired uniform tension to the rubber cords, grouped into cables:

Figure 6 is a side elevation and

Figure 7 is a sectional plan of a modified form of rubber cord spoke.

In carrying the invention into effect according to the form shown by way of illustration in Figures 1 and 2 of the accompanying drawings, the outer wheel part or felly is made in the form of an angle section of steel $a, a^1$. The solid rubber tyre $b$ is mounted on the flange $a$ and is held in position by the side rings $c, c$. The hub body $d$ is mounted on the shaft $e$ in any convenient manner. Rubber spokes connect the hub $d$ to the felly $a, a^1$ and these spokes are anchored at their ends to suitable anchoring means fixed in pairs, one member on the hub plate $d^1$ and the other on the felly flange $a^1$. According to the form shown in Figures 1 and 2, bobbins $f$ and $g$ constitute the anchoring means and are held by bolts $f^1$ and $g^1$ respectively in the felly flange $a^1$ and the hub plate $d^1$, which is bolted to the side of the hub corresponding to the side of the wheel at which the felly flange $a^1$ is located. Around the bobbins $f$ and $g$, there are wound rubber cords $h$, which constitute the bundles of thin rubber cord according to this invention. The separate cords of the bundles are grouped into cables composed of a large number of separate thin rubber cords $h^1$ encased in a fabric or other suitable covering $h^2$ (see Figures 3 and 4). Any convenient or desired number of turns or windings of the cable around the two bobbins $f$ and $g$ may be made. The ends of the cable are then fastened in any suitable manner. The cords are wound around the bobbins with an initial tension which is determined by the working conditions to which the road wheel is to be subjected when in use.

The number of the spokes constructed as described may be altered as required. Between the hub $d$ and the felly flange $a$ there is a sufficient space to enable these parts to move relatively to one another under the action of shocks received when the wheel is travelling over a road. The sum, both in direction and amount, of all the separate tensions applied to the cords is such that the hub is held centrally within the felly and both these parts are held in their proper positions in a vertical plane, even when side forces, such as occur in steering, are applied to the wheel. Nevertheless all vertical and side forces are transmitted to the vehicle in a resilient manner in virtue of the rubber suspension. The sum of all the tensions in the rubber cords amounts to several tons, although the tension in each strand is moderate. The omission of all metallic guides to prevent displacement of the hub and felly, improves the resiliency of the wheel and of course eliminates all danger of friction and disturbance through relatively sliding metallic parts. The front of the wheel is closed in by means of a shield plate or cover $k$, which is fixed to the retaining ring $c$. The annular space $i$ between the plate $d^1$ and the felly flange $a^1$ is closed by a rubber ring $m$ so as to prevent dust getting into the wheel.

The windings of rubber cord are preferably tensioned and prepared by the means illustrated in Figure 5. The bobbins $f$ and $g$ are fixed in a frame 2 of iron and are held in place by bolts 3. Three wedge shaped distance pieces are interposed between the bobbins $f$ and $g$, as for instance the two side wedge parts 4 and 6 and the central wedge part 5. The metal frame is suitably mounted in centres or pins 7, supported in bearings 8, so that the frame carrying the pair of bobbins properly spaced may be rotated. The pins 7 may also help to hold the wedges in position as indicated. The cable, constructed as described with reference to Figure 4, is then fastened at one end to one of the bobbins, say the bobbin $f$, whereupon the rubber cords therein are loaded with a sliding weight indicated at 9. The total tension between the wheel parts is considerably greater than the weight which will be placed on the wheel, so that under all conditions of working all the rubber cords will be in tension. With the method of tensioning shown in Figure 5, it will be seen that with N windings of cable in the bundle and W kilograms in the weight 9, the two bobbins will be subjected to a pull of:—2NW kg. If for instance N=45 and W=4 kg. then 2NW=360 kg. on each spoke so that, if for inst. 20 spokes are used, the total tension by which the hub and felly are connected amounts to 20×360 kg.=7200 kg., whilst each cord will only be subjected to a very moderate pull, namely in this case about 0,07 kg. per rubber cord. By the means described an even distribution of the load on all the rubber of the suspension spokes is secured. The bobbins when wound are taken from the frame 2 with the wedges still in place and are inserted in the wheel. When all the rubber spokes so prepared are in place, the wedges 4, 5 and 6 are removed and the hub and felly are thus connected by spokes having the designed initial tension.

In the form of the invention shown in Figures 6 and 7, the bundles are formed of a large number of separate lengths of cord $n$, held at their ends by clamping rings $p$ which are closed on the cords by means of screws $p^1$ with such force that the friction caused is adequate to withstand the initial tension applied to the cords, which may as before be grouped in cables. The bundles are then fastened in their positions in the wheel by pins $p^2$, which engage in the felly flange $a^1$ and the side plate $d^1$ of the hub.

The covering or casing of the cables may be omitted, but it has been found in practice to preserve the rubber and increase the life of the spokes. It will be understood that many constructional modifications may be made in the details of the wheel and in the parts more particularly constituting this invention. It is preferable however in all cases to preserve the open sided construction of the wheel which enables the parts of the wheel to be assembled in the manner described and which results from the use of the angle for the felly and the extended plate $d^1$ on the hub, both of which form the supporting members for the anchoring means of the rubber spokes.

Trials made over several thousand miles with this form of wheel have proved its durability, its resiliency and the absence of all heating and friction.

Having now particularly described and ascertained the nature of my said invention and in what manner the same is to be performed, I declare that what I claim is:—

1. A resilient wheel having an inner hub part and an outer concentric wholly independent felly part, anchoring means on the respective parts and extending coaxially of the wheel and in pairs aligned radially of the wheel, and an elastic member connecting each radial pair of anchoring means, said elastic member including a rubber cord anchored at its respective ends to the hub part and to the felly part and wound about the anchoring means of the pair successively, the winding of the elastic cord about the anchoring means constituting a series of loops in contact one with another longitudinally of the anchoring means, whereby the elastic member uniting the hub part and felly part provides a comparatively wide elastic band having its width parallel to the axis of the wheel and made up of a series of windings movable throughout their full lengths in any relative movement of the hub part and felly part.

2. A resilient wheel having an inner hub part, an outer concentric felly part, a series of spool-like bobbins projecting from the felly part parallel to the axis of the wheel, a series of spool-like bobbins projecting from the hub part parallel to the axis of the wheel, each bobbin on the hub part being in radial alignment with a bobbin on the felly part to constitute a pair of anchors, and an elastic cord having one end anchored to the hub and the opposite end anchored to the felly, the cord intermediate its anchors being wound in succession over and around a pair of anchors in a series of successive loops extending longitudinally of the anchoring means, with said loops arranged in superimposed groups, to thereby provide an elastic connection between the hub part and felly part made up of strands which are in multiple order axially of the wheel and in multiple order circumferentially of the wheel.

In testimony whereof I have affixed my signature.

FRITZ BERG.